(12) United States Patent
Kim et al.

(10) Patent No.: US 11,656,577 B2
(45) Date of Patent: May 23, 2023

(54) HOLOGRAPHIC WRITING METHOD AND HOLOGRAPHIC WRITING APPARATUS

(71) Applicants: KYUNGPOOK NATIONAL UNIVERSITY INDUSTRY-ACADEMIC COOPERATION FOUNDATION, Daegu (KR); KOREA RESEARCH INSTITUTE OF CHEMICAL TECHNOLOGY, Daejeon (KR)

(72) Inventors: Hak-Rin Kim, Daegu (KR); Jae-Won Ka, Daejeon (KR); Mi-Hye Yi, Daejeon (KR); Ae-Jin Yeon, Gyeongsangnam-do (KR); Kyung-Il Joo, Daegu (KR)

(73) Assignees: KYUNGPOOK NATIONAL UNIVERSITY INDUSTRY-ACADEMIC COOPERATION FOUNDATION, Daegu (KR); KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 398 days.

(21) Appl. No.: 16/678,963

(22) Filed: Nov. 8, 2019

(65) Prior Publication Data

US 2020/0201251 A1 Jun. 25, 2020

(30) Foreign Application Priority Data

Dec. 20, 2018 (KR) .......... 10-2018-0166255

(51) Int. Cl.
*G03H 1/04* (2006.01)
*G03H 1/02* (2006.01)

(52) U.S. Cl.
CPC ............ *G03H 1/0465* (2013.01); *G03H 1/02* (2013.01); *G03H 2001/0264* (2013.01);
(Continued)

(58) Field of Classification Search
CPC ............ G03H 1/0465; G03H 1/02; G03H 2001/0264; G03H 2260/12; G03H 2260/33; G03H 2260/35
(Continued)

(56) References Cited

U.S. PATENT DOCUMENTS

2005/0208388 A1* 9/2005 Furuki ............... G03H 1/02

FOREIGN PATENT DOCUMENTS

| JP | 2005-181872 A | 7/2005 |
| KR | 10-2009-0084899 A | 8/2009 |

(Continued)

OTHER PUBLICATIONS

"Characteristics of optically switchable holographic polymer-dispersed liquid crystal transmission gratings" by Su t al, Optical Materials 34 (2011) 251-255. (Year: 2011).*

(Continued)

*Primary Examiner* — Audrey Y Chang
(74) *Attorney, Agent, or Firm* — Procopio, Cory, Hargreaves & Savitch LLP

(57) ABSTRACT

Disclosed are a holographic writing method and apparatus capable of re-writing (updating) holographic information and quickly writing the holographic information with high efficiency. In an embodiment, a holographic writing method for writing holographic information by emitting a beam at a holographic recording medium containing a photo-responsable polymer material having photoisomerization characteristics that change a molecular structure thereof by absorbing light energy, writes the holographic information by using a writing wavelength different from a maximum absorption wavelength in a light absorption spectrum of photoisomer molecule structures of the holographic recording medium. The maximum absorption wavelength is a wavelength at which light absorption rate is maximum in the light absorp-
(Continued)

tion spectrum. A difference between the light absorption rates of the photoisomer molecule structures at the writing wavelength is less than a difference between the light absorption rates of the photoisomer molecule structures at the maximum absorption wavelength.

11 Claims, 15 Drawing Sheets

(52) U.S. Cl.
CPC ..... *G03H 2260/12* (2013.01); *G03H 2260/33* (2013.01); *G03H 2260/35* (2013.01)

(58) Field of Classification Search
USPC ........................................ 359/4, 3; 430/1, 2
See application file for complete search history.

(56) References Cited

FOREIGN PATENT DOCUMENTS

| KR | 10-2010-0039784 A | 4/2010 |
|---|---|---|
| KR | 10-1869388 B1 | 6/2018 |
| KR | 10-20180117828 A | 10/2018 |

OTHER PUBLICATIONS

"The absorption spectrum of cis-azobenzene" by Vetrakova et al, The Royal Society of Chemistry and Owner Societies, 2017, 16, pp. 1749-1756. (Year: 2017).*

Blanche, P. et al. "Holographic three-dimensional telepresence using large-area photorefractive polymer" in Nature, Nov. 4, 2010, pp. 80-83, vol. 468.

Li, X. et al. "Video-Rate Holographic Display Using Azo-Dye-Doped Liquid Crystal" in Journal of Display Technology, Jun. 2014, pp. 438-443, vol. 10, No. 6.

Tsutsumi, N. et al. "Fully Updatable Three-Dimensional Holographic Stereogram Display Device Based on Organic Monolithic Compound" in Optics Express, Aug. 26, 2013, vol. 21, No. 17 (5 pages).

Shishido, Atsushi "Rewritable Holograms Based on Azobenzene-Containing Liquid-Crystalline Polymers" in Polymer Journal, May 26, 2010, pp. 525-533, vol. 42.

Hagen, R. et al. "Photoaddressable Polymers for Optical Data Storage" Advanced Materials, Dec. 3, 2001, pp. 1805-1810, vol. 13, No. 23.

Provenzano, C. et al. "Polarization Holograms in a Bifunctional Amorphous Polymer Exhibiting Equal Values of Photoinduced Linear and Circular Birefringences" in The Journal of Physical Chemistry, Sep. 4, 2014, pp. 11849-11854, vol. 118.

Ishii, N. et al. "A real-time dynamic holographic material using a fast photochromic molecule" in Scientific Reports, Nov. 8, 2012, pp. 1-5, vol. 2, No. 819.

Wie, J. et al. "Photomotility of polymers" in Nature Communications, Nov. 10, 2016, pp. 1-8.

Choi, J. et al. "Direct Fabrication of Micro/Nano-Patterned Surfaces by Vertical-Directional Photofluidization of Azobenzene Materials" in ACS Nano, Jan. 12, 2017, 8 pages.

Kobayashi, Y. et al. "Real-Time Dynamic Hologram of a 3D Object with Fast Photochromic Molecules" Advanced Optical Materials, 2016, pp. 1-4.

Tay, S. et al. "An updatable holographic three-dimensional display" Nature, Feb. 7, 2008, pp. 694-698, vol. 451.

* cited by examiner (a)

(b)

(a)

(b)

(c)

(a)

(b)

(c)

HOLOGRAPHIC WRITING METHOD AND HOLOGRAPHIC WRITING APPARATUS

CROSS-REFERENCE TO RELATED APPLICATIONS

This U.S. non-provisional patent application claims priority under 35 U.S.C. § 119 of Korean Patent Application No. 10-2018-0166255, filed on Dec. 20, 2018, the entire contents of which are hereby incorporated by reference.

BACKGROUND

The present disclosure herein relates to a holographic writing method and a holographic writing apparatus, and more particularly, to holographic writing method and apparatus with high sensitivity and fast dynamics properties capable of quickly writing holographic information to a photo-responsable polymer recording medium with high efficiency.

Hologram displays are realistic displays for providing a sense of three dimensions and a sense of reality such as the equivalent of viewing actual objects, make it unnecessary for users to wear glasses, relieve eye strain, and prevent spatial distortion compared to normal 3D image devices. Recently, holographic writing technology has been applied not only to displays but also to a wide range of fields such as optical component manufacturing, information recording and security, printing, and education because of the development of the optical industry and laser technology.

Types of holograms are divided into analog and digital holograms according to writing methods and include other similar hologram technologies that mimic holographic image effects. Analog hologram writing methods reproduce an object by using photography techniques for capturing the three-dimensional image of the object on a film such as silver chloride and developing the film. Digital hologram writing methods provide a sense of reality through digitalizing and reproducing the light reflected from an object. The similar hologram technology implements an effect similar to that of a hologram by using a transflective image screen and an ultra multi-view stereoscopic image.

Holographic writing materials include silver halide, dichromated gelatin (DCG), a photoresist, photochromics, photo thermoplastics, a photopolymer, and a photorefractive material, a photo-responsable polymer material, and the like. Silver halide film is the oldest material and has been developed in general photography technology to be used as a holographic writing material. Silver halide has a high resolution, high sensitivity, and a high photosensitive bandwidth compared to other materials, but needs to go through a chemical wet treatment (developing process) and has a short lifespan after a hologram is written to the same.

The DCG contains ammonia dichromate as a photosensitive emulsion on a gelatin substrate and allows a hologram to be written thereto by using the characteristic of being cured by chemical photo-crosslinking due to exposure. The DCG is often used for a volume phase hologram and has low absorption and scattering, a high refractive index modulation, a high resolution, and a modulation transfer function. However, since dry plates or films coated with gelatin are not commercialized, the experimenter needs to manufacture the same directly, and since gelatin is sensitive to environmental changes such as changes in temperature, pressure, and humidity, the lifespan of a hologram written thereto is short.

The photopolymer is composed of a monomer, a binder, a photoinitiator, a photosensitizer, a dye, and the like, does not go through a wet treatment process unlike the silver halide and the DCG, has an improved sensitivity and resolution and high diffraction efficiency. The photoresist is a writing material by which holograms can be mass produced at the lowest price, and is widely used in credit cards, anti-forgery holograms, and security documents. Holographic writing media such as photopolymers and photoresists have merits such as a high resolution, low writing energy, and full color writing. However, since once written holographic information has physical properties being not removed, it is impossible to re-write the holographic information.

Meanwhile, N. Peyghambarian at Arizona State University in the United States has published in 2010 the results of research on a rewritable (updatable) holographic video conferencing system that can rewrite one sheet of a holographic image every two seconds by using photorefractive polymers. However, a very high voltage is required to write holographic information because of the physical properties of the photorefractive polymer, and a very high voltage of about 4,000 V or higher must be applied thereto to stably write the holographic information on thick holographic writing films.

Photo-responsable polymer materials are typically azobenzene polymer materials. The azobenzene material has a unique characteristic of converting absorbed light energy into mechanical energy that changes the molecular structure. Holographic writing methods based on photo-responsable polymers have been studied by initially doping single azobenzene molecules with a material such as liquid crystal having optical anisotropy and inducing an indirect effect. However, when the process is repeated, it is difficult to maintain a uniform doping state of the single azobenzene molecule, to write high-resolution holographic information because of the characteristics of the liquid crystal, and to use the photo-responsable polymer material as any form of writing material.

To solve the shortcomings of such an azo-doped liquid crystal system, a liquid crystalline azobenzene material in which a chemical group capable of inducing optical anisotropy is synthesized with the single azobenzene molecule has been developed. To form a stable holographic film, research on dispersing a liquid crystalline azobenzene material in a polymer matrix has been conducted and has a merit of obtaining a high writing resolution and forming a stable film. To make photoisomerization of azobenzene fast and high efficient, holographic information has been written by using a laser beam having the wavelength in which the light absorption rate is maximized. However, it is difficult to realize a uniform distribution of the azobenzene material in the polymer matrix.

To address the issue, research on azobenzene polymer materials in which an azobenzene liquid crystalline material is chemically bonded to a polymer backbone is being conducted. The azobenzene polymer material is different from existing materials which are doped with the azobenzene material in terms of the parameters when azobenzene molecules are photoisomerized. Typically, parameters such as the free volume, dipole moment, and Vander Walls force of the azobenzene molecule represent the difference. These factors make even slower reverse photoisomerization of the azobenzene molecule. For this reason, the characteristics of holographic writing to azobenzene-based polymer films have a very slow operating characteristic that it takes 10 minutes or more to write holographic information to the maximum diffraction efficiency.

SUMMARY

An embodiment of the inventive concept provides a holographic writing method for writing holographic information by emitting a beam at a holographic recording medium containing a photo-responsable polymer material having photoisomerization characteristics that change a molecular structure thereof by absorbing light energy, writes the holographic information by using a writing wavelength different from a maximum absorption wavelength in a light absorption spectrum of the photoisomer molecule structures of the holographic recording medium, in which the maximum absorption wavelength is a wavelength at which light absorption rate is maximum in the light absorption spectrum, and a difference between the light absorption rates of the photoisomer molecule structures at the writing wavelength is less than a difference between the light absorption rates of the photoisomer molecule structures at the maximum absorption wavelength.

In an embodiment, the writing wavelength may be a wavelength at which the light absorption rates of the photoisomer molecule structures match in the light absorption spectrum.

In an embodiment, the photo-responsable polymer material may contain an azo polymer material having a covalent bond structure between nitrogens. In an embodiment, the azo polymer material may contain an azobenzene polymer material. In an embodiment, the azobenzene polymer material may be a material in which a liquid crystalline azobenzene material is dispersed in a polymer matrix.

In an embodiment, the photoisomer molecule structures may include a trans-isomer molecule structure and a cis-isomer molecule structure, and the writing wavelength may be a wavelength at which a light absorption rate of the trans-isomer molecule structure and a light absorption rate of the cis-isomer molecule structure match.

In an embodiment, the photo-responsable polymer material may be aligned in a direction perpendicular to a polarization direction of the beam by continuously emitting the beam at the writing wavelength so that the photo-responsable polymer material is repeatedly switched between the trans-isomer molecule structure and the cis-isomer molecule structure.

In an embodiment, diffraction efficiency of the photo-responsable polymer material at the writing wavelength may be higher than diffraction efficiency of the photo-responsable polymer material at the maximum absorption wavelength.

In an embodiment, the writing wavelength may be greater than the maximum absorption wavelength. In an embodiment, the writing wavelength may be about 60 nm to about 100 nm greater than the maximum absorption wavelength.

In an embodiment, the writing wavelength may be greater than a wavelength at which the light absorption rates of the photoisomer molecule structures match in the light absorption spectrum. In an embodiment, the writing wavelength may be about 5 nm to about 15 nm greater than the wavelength at which the light absorption rates of the photoisomer molecule structures match in the light absorption spectrum.

In an embodiment of the inventive concept, a holographic writing apparatus for writing holographic information by emitting a beam at a holographic recording medium containing a photo-responsable polymer material having photoisomerization characteristics that change a molecular structure thereof by absorbing light energy, includes a light emission unit configured to write the holographic information by emitting the beam at the holographic recording medium, in which the light emission unit writes the holographic information by emitting the beam at a writing wavelength different from a maximum absorption wavelength in a light absorption spectrum of photoisomer molecule structures of the holographic recording medium, the maximum absorption wavelength is a wavelength at which light absorption rate is maximum in the light absorption spectrum, and a difference between the light absorption rates of the photoisomer molecule structures at the writing wavelength is less than a difference between the light absorption rates of the photoisomer molecule structures at the maximum absorption wavelength.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
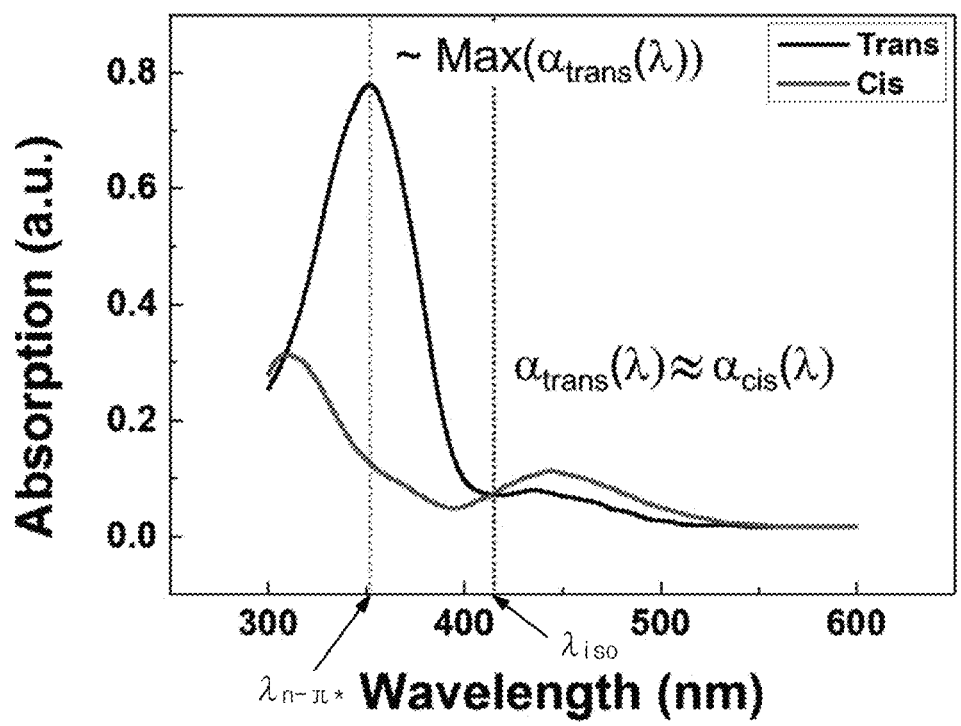
FIG. 1 is a graph of a light absorption spectrum of photoisomer molecule structures of a photo-responsable polymer material.

The merits and characteristics of the present disclosure and the methods of achieving the same will become more apparent from the following embodiments taken in conjunction with the accompanying drawings. However, the present invention is not limited to the embodiments disclosed below, and the present invention is only defined by the scope of the claims. Although not defined, all terms (including technical or scientific terms) used herein have the same meaning as commonly accepted by the generic art in the prior art to which this invention belongs. The general description of known configurations may be omitted so as not to obscure the gist of the present invention. In the drawings of the present invention, the same reference numerals are used as many as possible for the same or corresponding configurations. To facilitate understanding of the present invention, some configurations in the figures may be shown somewhat exaggerated or reduced.

The terminology used herein is for the purpose of describing particular embodiments only and is not intended to be limiting of the invention. The singular forms, "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The purpose of an embodiment of the inventive concept is to provide a high sensitivity and fast dynamics properties holographic writing method and apparatus based on a photo-responsable polymer material, which may re-write (update) holographic information and may have high-efficiency and fast-response characteristics. The holographic writing method, in accordance with an embodiment, writes the holographic information by using a writing wavelength at which a difference between the light absorption rates of photoisomer molecule structures is less than a difference between the light absorption rates of the photoisomer molecule structures at the maximum absorption wavelength of the photo-responsable polymer material, without writing the holographic information by using a laser beam having the maximum absorption wavelength.

FIG. 1 is a graph of a light absorption spectrum of the photoisomer molecule structures of the photo-responsable polymer material. A photo-responsable material, having photoisomerization characteristics, is changed in molecular structure by absorbing light energy, and as the molecular structure changes, the characteristics of a light absorption spectrum thereof also changes. In an embodiment, the photoisomer molecule structures of the photo-responsable material may include two kinds of molecular structures, a trans-isomer molecule structure and a cis-isomer molecule structure. FIG. 1 illustrates a light absorption spectrum of the trans-isomer molecule structure as a black graph and a light absorption spectrum of the cis-isomer molecule structure as a red graph.

An existing holographic writing method writes holographic information to a photo-responsable polymer recording medium by using a laser beam having the maximum absorption wavelength $\lambda_{n-\pi^*}$ at which a light absorption rate $\alpha_{trans}(\lambda)$ of a trans-isomer molecule structure is maximum to make photoisomerization of a photo-responsable polymer material fast and high efficient. Since the light absorption rate $\alpha_{trans}(\lambda)$ of the trans-isomer molecule structure is maximum at the maximum absorption wavelength $\lambda_{n-\pi^*}$, the photoisomerization from the trans-isomer molecule structure to a cis-isomer molecule structure is promoted. However, since a difference $\alpha_{trans}(\lambda)-\alpha_{cis}(\lambda)$ between the light absorption rates of the trans-isomer molecule structure and the cis-isomer molecule structure is great, the dynamic response characteristics of reverse isomerization from the cis-isomer molecule structure to the trans-isomer molecule structure are reduced.

To improve the dynamic response characteristics of the photo-responsable polymer material, the holographic writing method in accordance with an embodiment writes the holographic information to the photo-responsable polymer recording medium by using a laser beam having a writing wavelength $\lambda_{iso}$ at which a difference $\alpha_{trans}(\lambda)-\alpha_{cis}(\lambda)$ between the light absorption rates of the trans-isomer molecule structure and the cis-isomer molecule structure is less, without writing the holographic information to the photo-responsable polymer recording medium by using a laser beam having the maximum absorption wavelength $\lambda_{n-\pi^*}$. In an embodiment, the difference between the light absorption rates of the photoisomer molecule structures at the writing wavelength $\lambda_{iso}$ of the beam for writing the holographic information may be less than a difference between the light absorption rates of the photoisomer molecule structures at the maximum absorption wavelength $\lambda_{n-\pi^*}$.

The difference between the light absorption rates of the photoisomer molecule structures at the writing wavelength $\lambda_{iso}$ is less than ½ of the difference between the light absorption rates of the photoisomer molecule structures at the maximum absorption wavelength $\lambda_{n-\pi^*}$, for example, less than ⅕, or for example, less than 1/10. In an embodiment, the writing wavelength $\lambda_{iso}$ may be a wavelength at which the light absorption rate $\alpha_{trans}(\lambda)$ of the trans-isomer molecule structure and the light absorption rate $\alpha_{cis}(\lambda)$ of the cis-isomer molecule structure substantially match. In an embodiment, the holographic information may be written by using a beam in a visible band of about 400 nm to about 700 nm.

Figure 2:
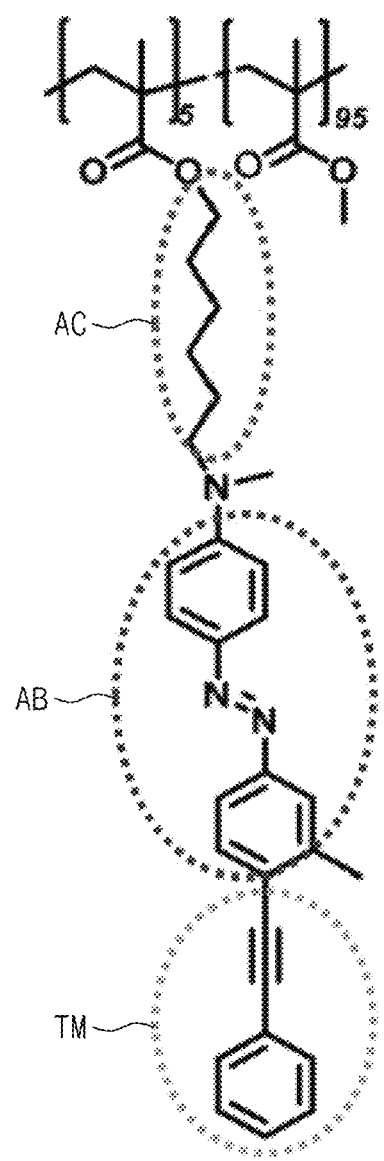
FIG. 2 is a diagram illustrating a molecule structure of an azobenzene polymer material.

In an embodiment, the photo-responsable polymer material may contain an azo polymer material having a covalent bond structure between nitrogens. In an embodiment, the azo polymer material may contain an azobenzene polymer material. In an embodiment, the azobenzene polymer material may be a material in which a liquid crystalline azobenzene material is dispersed in a polymer matrix. FIG. 2 is a diagram illustrating a molecule structure of the azobenzene polymer material, for example, a chemical structure of a pH-5/95 azobenzene polymer material. The pH-5/95 azobenzene polymer material has a molecular structure in which a flexible alkyl chain AC and an azobenzene molecule AB are synthesized as side chains with a main chain of a polymethyl methacrylate (PMMA) polymer, and tolane moiety TM is added to an end of an azobenzene material to induce high optical anisotropy.

Figure 3:
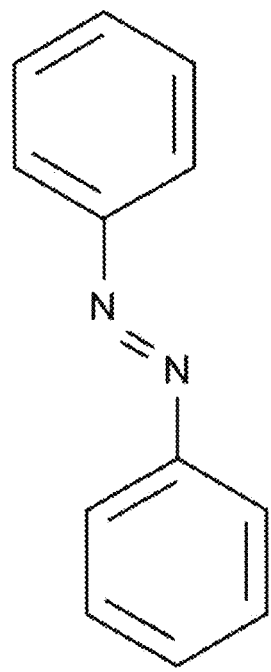
FIG. 3 is a diagram of a trans-azobenzene molecule structure of the photo-responsable polymer material.
Figure 4:
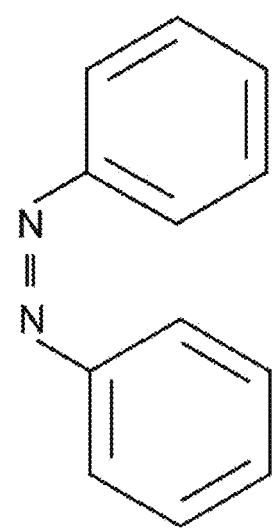
FIG. 4 is a diagram of a cis-azobenzene molecule structure of the photo-responsable polymer material.
Figure 5:
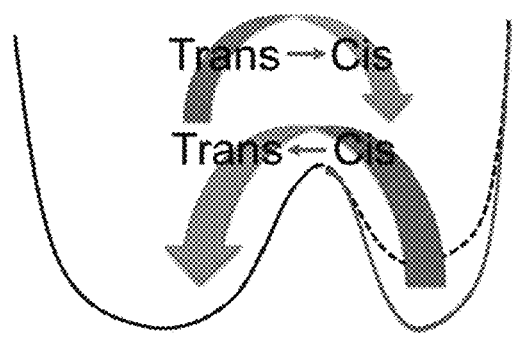
FIG. 5 is a conceptual diagram of an energy band required for photoisomerization between trans- and cis-isomers in an azobenzene molecule.

FIG. 3 is a diagram of a trans-azobenzene molecule structure of the photo-responsable polymer material. FIG. 4 is a diagram of a cis-azobenzene molecule structure of the photo-responsable polymer material. FIG. 5 is a conceptual diagram of an energy band required for photoisomerization between trans- and cis-isomers in the azobenzene molecule AB. A single-molecular material of materials, in which photoisomerization occurs, allows the writing to be performed at the maximum absorption wavelength $\lambda_{n\text{-}\pi^*}$ at which very fast response characteristics appear for the trans-to-cis photoisomerization due to photoactivation thereof.

FIG. 5 illustrates an energy band of the trans-isomer molecule structure of the photo-responsable material as a black line, an energy band of a cis-isomer molecule structure of a photo-responsable single molecule material as a black dotted line, and an energy band of the cis-isomer molecule structure of the photo-responsable polymer material. For the photo-responsable single molecule material, the cis-isomer molecule structure excited by an excitation beam from the trans-isomer has an energetically excited unstable state, and the cis-isomer molecule structure returns to the trans-isomer molecule structure, which is in a stable state, in a short time since an energy barrier is low in the reverse isomerization from the cis-isomer molecule structure to the trans-isomer molecule structure. Thus, since the reverse isomerization of the photo-responsable single molecule material quickly occurs, the photo-responsable single molecule material exhibits very fast response characteristics even when the holographic information is written at the maximum absorption wavelength $\lambda_{n\text{-}\pi^*}$ at which a light absorption rate of the trans-isomer has the maximum value $Max(\alpha_{trans}(\lambda))$.

However, when a liquid crystalline photoisomerization material is dispersed in the polymer matrix to overcome the limitation of a single-molecular photoisomerization material, the cis-isomer becomes more stable than that in the single-molecular material and decay life time thereof is significantly increased. First, the reason is that free volumes recognized by individual molecules of the polymer material and the single-molecular material are different. The single-molecular material has the free volume close to infinity. However, when the liquid crystalline photoisomerization material is dispersed in the polymer matrix, the free volume is restricted, and the cis-isomer becomes more stable in terms of the energy.

Second, the polymer material has a more polar environment than that the single-molecular material because of the polymer matrix therearound. For example, a chemical interaction or bond occurs between polar substituents of the liquid crystalline photoisomerization material and the polymer matrix. Thus, an energy barrier from the cis-isomer to the trans-isomer is significantly increased than that in the single-molecular material. As a result, the reverse isomerization in which a molecule excited as the cis-isomer is reversely isomerized into the trans-isomer without an additional external stimulus is significantly reduced.

For a photoisomerization polymer bonded to a main chain of a polymer by an alkyl chain or the like, a free volume of the photoisomerization polymer is further reduced, and a bonding force between the photoisomerization polymer and the main chain of the polymer is also increased. Thus, an energy state of the cis-isomer becomes more stable than that of the cis-isomer when the photoisomerization polymer is dispersed in the matrix, and the reverse isomerization thus further slows. For the reasons, when the holographic information is written to the photo-responsable polymer recording medium by using the maximum absorption wavelength $\lambda_{n\text{-}\pi^*}$ trans-to-cis dynamics are very fast. However, cis-to-trans dynamics are very slow because of the stable energy state of the cis-isomer, and the overall holographic writing dynamics of the photo-responsable polymer material thus significantly slow.

The reason that the cis-to-trans dynamics is important in the holographic writing is due to the Weigert effect. The photoisomerization material has a characteristic of returning in a random direction other than an initial existing direction thereof when the molecular structure of the photoisomerization material returns from the cis-isomer molecule structure to the trans-isomer molecule structure. The Weigert effect means that molecules are aligned in a direction perpendicular to the direction of polarization of an emitted beam, in which it is the least likely that the photoisomerization material is excited by the emitted beam while repeating trans-to-cis and cis-to-trans cycles.

When the holographic information is written by using the photoisomerization material, writing efficiency and characteristics are increased in writing the holographic information by aligning a long axis of the photoisomerization material by using the Weigert effect rather than simply writing the holographic information by exciting the photoisomerization material with the light for the photoisomerization from the trans-isomer molecule structure to the cis-isomer molecule structure. Thus, for holographic writing based on a photoisomerization polymer material, the cis-to-trans dynamics as well as the trans-to-cis dynamics are very important, and it is required that the holographic information is written at a writing wavelength different from that for the single-molecular material.

In an embodiment, to improve the energy efficiency and dynamics characteristics of the holographic writing method based on the photo-responsable polymer material, the holographic information may be written to the photo-responsable polymer recording medium by using the writing wavelength $\lambda_{iso}$ at which the cis-to-trans reverse isomerization and the trans-to-cis isomerization may be simultaneously taken place by the excitation beam with similar efficiency, for example, the writing wavelength $\lambda_{iso}$ at which the trans-isomer and the cis-isomer have a similar light absorption rate, such that the photo-responsable polymer material may be switched between the trans-isomer molecule structure and the cis-isomer molecule structure so as to be aligned in a direction perpendicular to the direction of polarization of the excitation beam. Thus, the dynamic response characteristics of the photo-responsable polymer material may be improved, and the holographic information may be written or re-written with high efficiency and high response characteristics by using a low energy beam.

Figure 6:
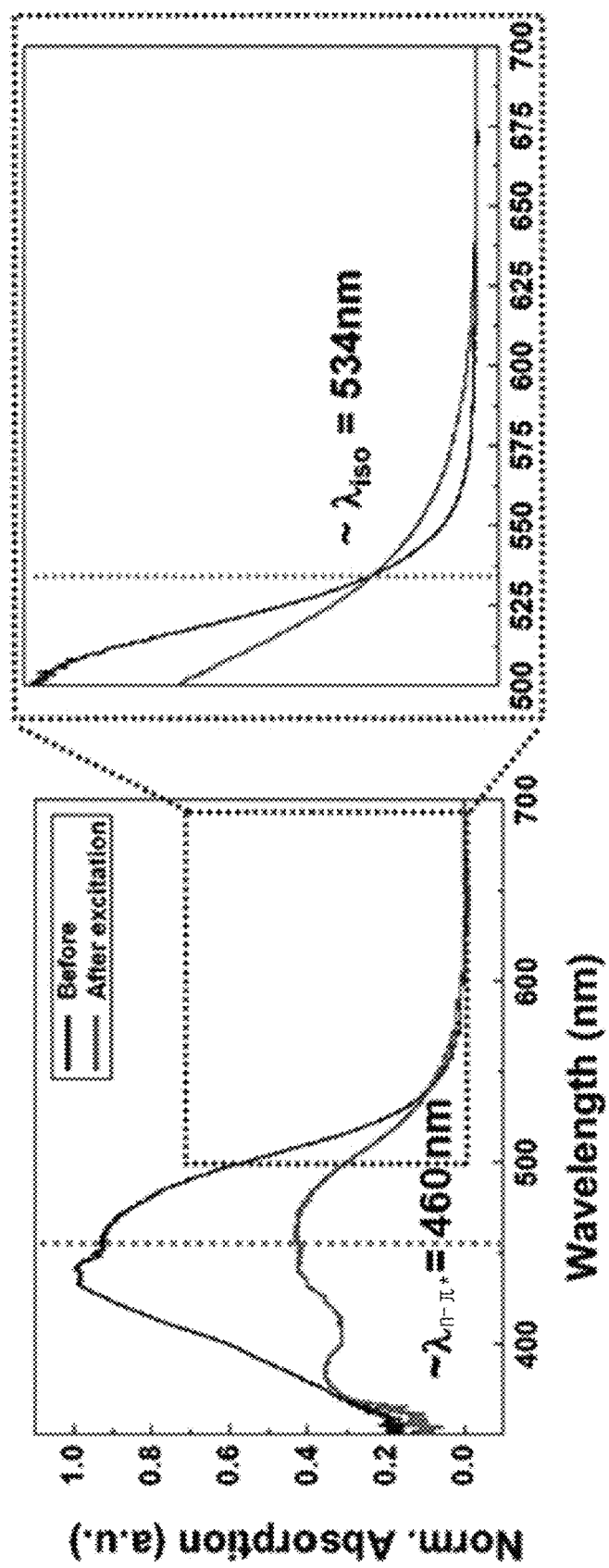
FIG. 6 is a graph of a light absorption spectrum of a pH-5/95 azobenzene polymer material.

FIG. 6 is a graph of a light absorption spectrum of the pH-5/95 azobenzene polymer material. When the holographic information is written to the azobenzene polymer material by using the laser beam having the maximum absorption wavelength $\lambda_{n\text{-}\pi^*}$, the dynamic response characteristics of the reverse isomerization are reduced by the stable state of the cis-isomer. To address the issue, the holographic writing method in accordance with an embodiment may write the holographic information to the azobenzene polymer by using the writing wavelength $\lambda_{iso}$ at which the trans-isomer and the cis-isomer have the similar light absorption rate such that the trans-to-cis isomerization and the cis-to-trans reverse isomerization may occur with similar efficiency.

In the light absorption spectrum of the pH-5/95 azobenzene polymer material, the maximum absorption wavelength $\lambda_{n-\pi*}$ is about 460 nm, and the writing wavelength $\lambda_{iso}$ at which the trans-isomer and the cis-isomer have the similar light absorption rate is about 534 nm. The light absorption rate of the trans-isomer at the maximum absorption wavelength $\lambda_{n-\pi*}$ is maximum, whereas the light absorption rate of the cis-isomer is low, and the difference between the light absorption rates of the trans-isomer and the cis-isomer is great. Thus, the writing wavelength $\lambda_{iso}$ at which the light absorption rates of the trans-isomer and the cis-isomer are similar is different from the maximum absorption wavelength $\lambda_{n-\pi*}$.

As the writing wavelength $\lambda_{iso}$ is greater than the maximum absorption wavelength $\lambda_{n-\pi*}$, the difference between the light absorption rates of the trans-isomer and the cis-isomer becomes lesser. Thus, the writing wavelength $\lambda_{iso}$ may be greater than the maximum absorption wavelength $\lambda_{n-\pi*}$. In an embodiment, the writing wavelength $\lambda_{iso}$ may be about 60 to about 100 nm greater than the maximum absorption wavelength $\lambda_{n-\pi*}$ such that the trans-isomer and the cis-isomer have the similar light absorption rate. For the pH-5/95 azobenzene polymer material, the writing wavelength $\lambda_{iso}$ may be about 520 nm to about 560 nm, for example, about 530 nm to about 540 nm.

Figure 7:
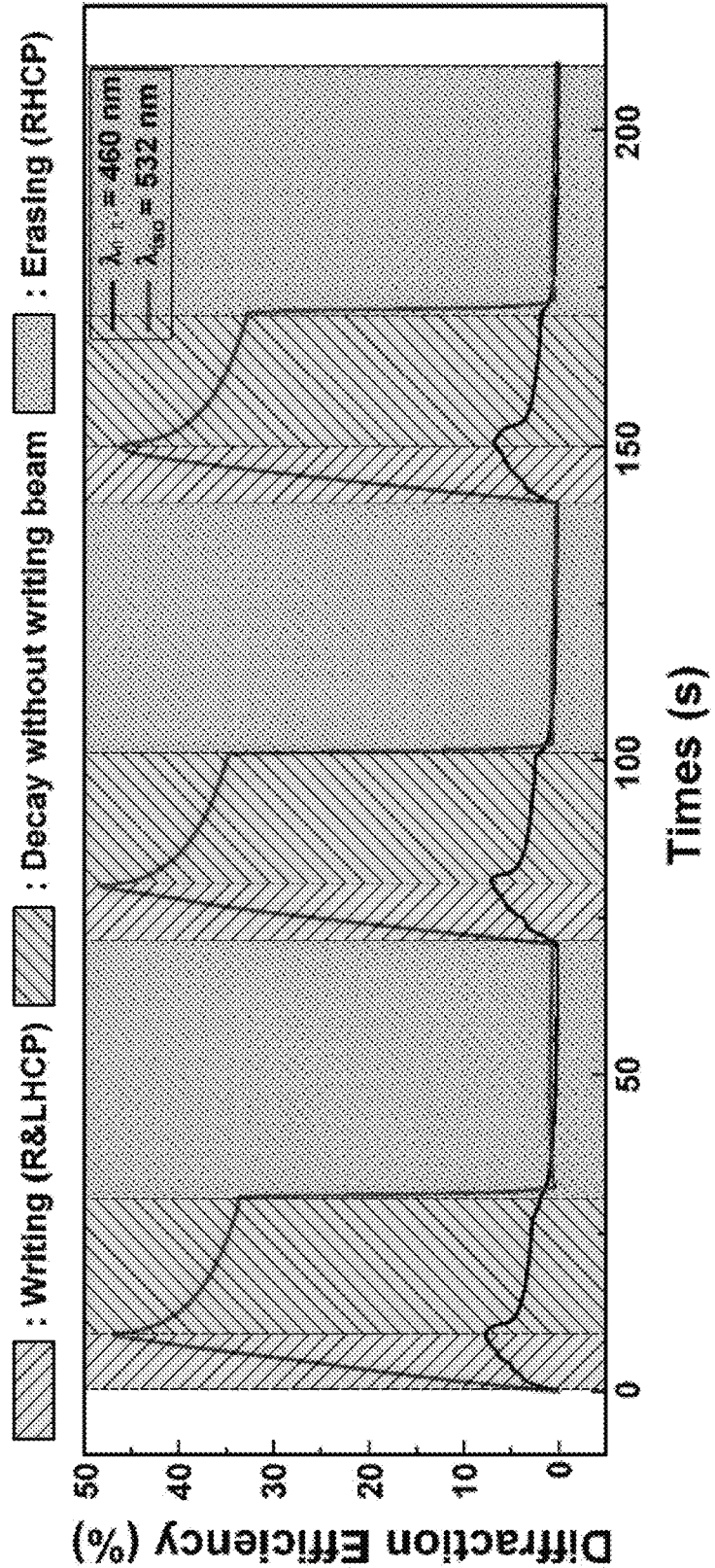
FIG. 7 is a graph illustrating the results of the holographic diffraction efficiency characteristics of the pH-5/95 azobenzene polymer material according to a writing wavelength thereof.

Holographic writing characteristics may be evaluated by measuring diffraction efficiency characteristics due to emission of the writing wavelength. FIG. 7 is a graph illustrating the results of the holographic diffraction efficiency characteristics of the pH-5/95 azobenzene polymer material according to a writing wavelength thereof. The diffraction efficiency was measured by repeating a process of writing the holographic information to an azobenzene polymer recording medium for 10 seconds, interrupting the writing for 20 seconds, and deleting the holographic information for 40 seconds, at each of the maximum absorption wavelength $\lambda_{n-\pi*}$ and the writing wavelength $\lambda_{iso}$ at which the trans- and cis-isomers have the similar light absorption rate.

Figure 8:
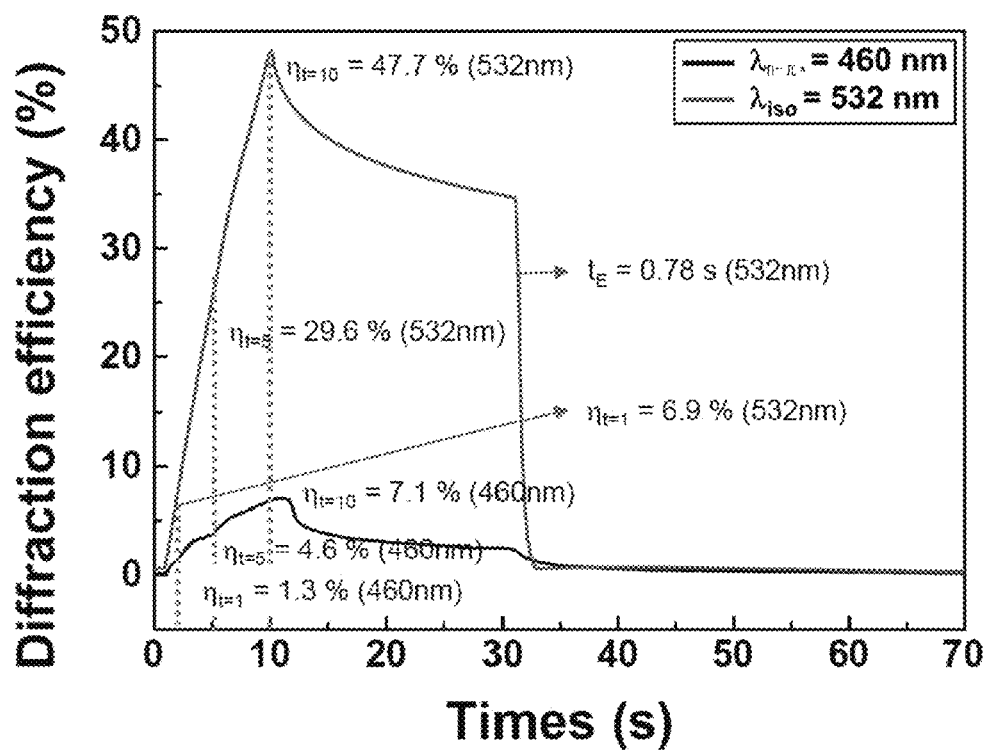
FIG. 8 is a graph illustrating changes in the holographic diffraction efficiency of the pH-5/95 azobenzene polymer material in a writing section according to the writing wavelength thereof.

FIG. 8 is a graph illustrating changes in the holographic diffraction efficiency of the pH-5/95 azobenzene polymer material in a writing section according to the writing wavelength thereof. As illustrated in FIG. 8, "$\eta_{t=1}$" is the diffraction efficiency at a time when one second has elapsed after the writing starts, "$\eta_{t=5}$" is the diffraction efficiency at a time when five seconds have elapsed after the writing starts, "$\eta_{t=10}$" is the diffraction efficiency at a time when 10 seconds have elapsed after the writing starts, and "$t_E$" is the time required for deleting the information.

Referring to FIGS. 7 and 8, it can be seen that, when the holographic information is written to the photo-responsable polymer material for 10 seconds by using a laser beam having the same polarization and energy, low diffraction efficiency of about 7% is exhibited at the maximum absorption wavelength $\lambda_{n-\pi*}$ of about 460 nm, high diffraction efficiency of higher than or equal to about 48% is exhibited at the writing wavelength $\lambda_{iso}$ of about 532 nm at which the trans-isomer and the cis-isomer have the similar light absorption rate, and holographic interference pattern writing efficiency and dynamic response characteristics about 600% to about 700% improved than those when the holographic information is written at the maximum absorption wavelength $\lambda_{n-\pi*}$ about 460 nm are exhibited. The characteristics are because the Weigert effect of the azobenzene molecule is quickly induced by the active induction of both the trans-to-cis isomerization and the cis-to-trans reverse isomerization described above.

Figure 9:
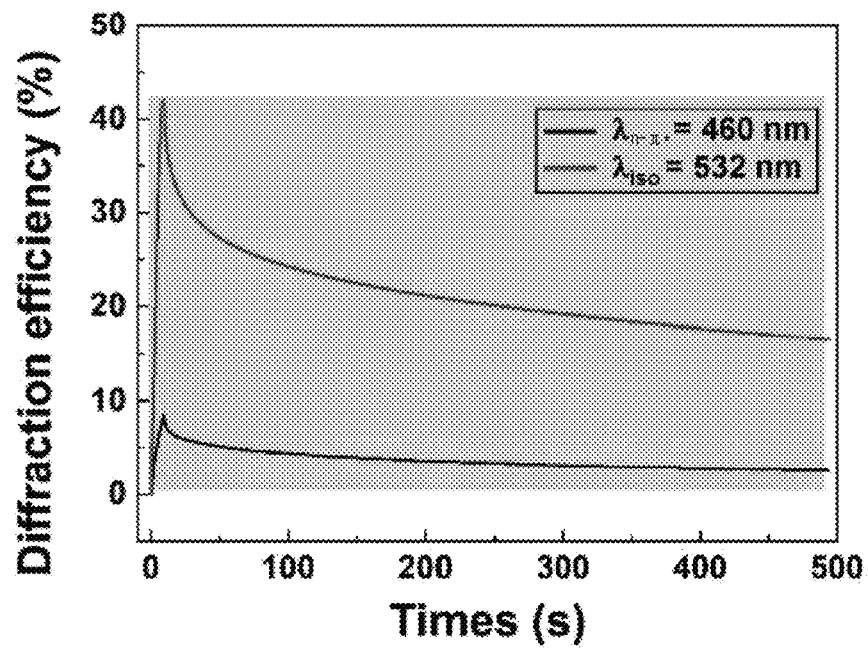
FIG. 9 is graphs illustrating the diffraction efficiency reduction characteristics and normalized diffraction efficiency reduction characteristics of the pH-5/95 azobenzene polymer material in a writing stop section.
Figure 9:
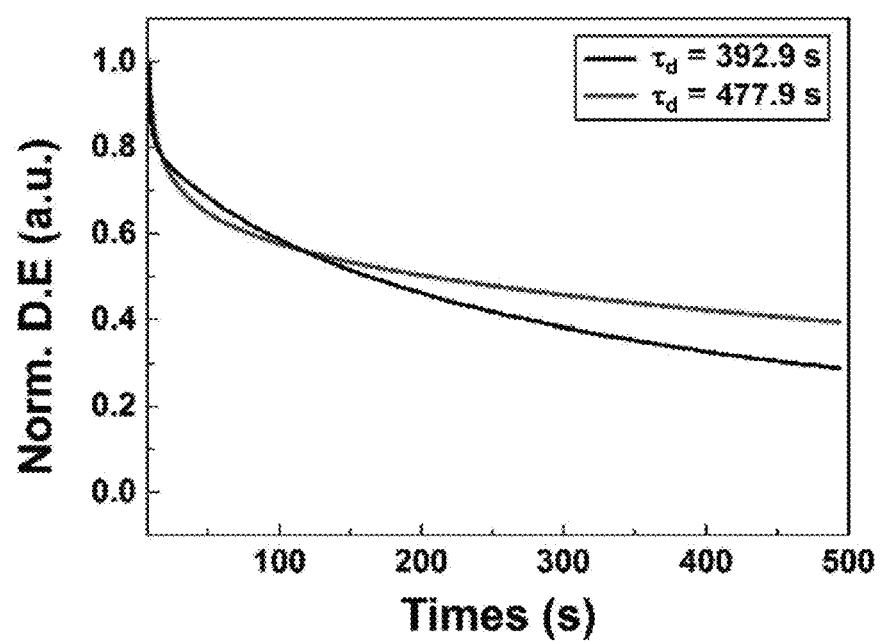

(a) of FIG. 9 is a graph illustrating the diffraction efficiency reduction characteristics of the pH-5/95 azobenzene polymer material, and (b) of FIG. 9 is a graph illustrating the normalized diffraction efficiency reduction characteristics thereof, in a writing stop section. When the holographic information was written by using the maximum absorption wavelength $\lambda_{n-\pi*}$ of about 460 nm, diffraction efficiency reduction time $\tau_d$ was short. However, when the holographic information was written by using the writing wavelength $\lambda_{iso}$ of about 532 nm at which the trans- and cis-isomers have the similar light absorption rate, the diffraction efficiency reduction time $\tau_d$ was 477.9 seconds and increased about 58% than that when the holographic information was written by using the maximum absorption wavelength $\lambda_{n-\pi*}$ about 460 nm.

The diffraction efficiency reduction time $\tau_d$ was calculated from Equation $$\eta = \eta_0 \left[ e^{-\left(\frac{t}{\tau_d}\right)^\beta} \right]$$

where "$\eta$" is the diffraction efficiency, "$\eta_0$" is the maximum diffraction efficiency, "t" is the elapsed time from a time when the maximum diffraction efficiency $\eta_0$ is reached by the writing using the excitation beam to a time when the writing using the excitation beam is stopped, and $\beta$ is a dispersion parameter. From the results of FIG. 9, it can be seen that, when the holographic information is written by using the writing wavelength $\lambda_{iso}$ of about 532 nm at which the trans- and cis-isomers have the similar light absorption rate, the holographic information lasts longer than that written at the maximum absorption wavelength $\lambda_{n-\pi*}$ of about 460 nm.

Figure 10:
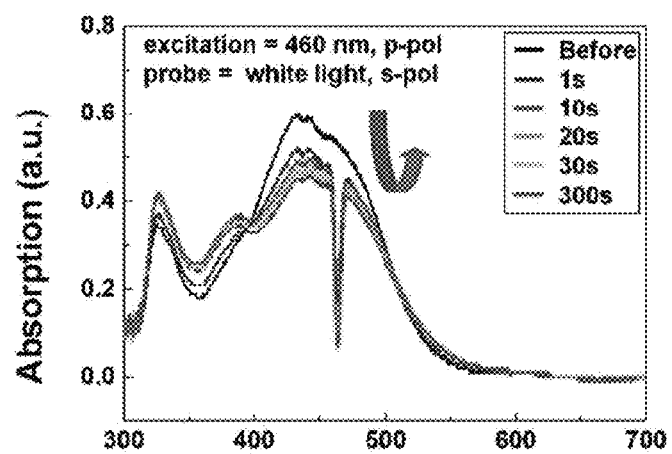
FIG. 10 is graphs illustrating the change characteristics of the light absorption spectrum of the pH-5/95 azobenzene polymer material in a process of writing holographic information at the maximum absorption wavelength.
Figure 10:
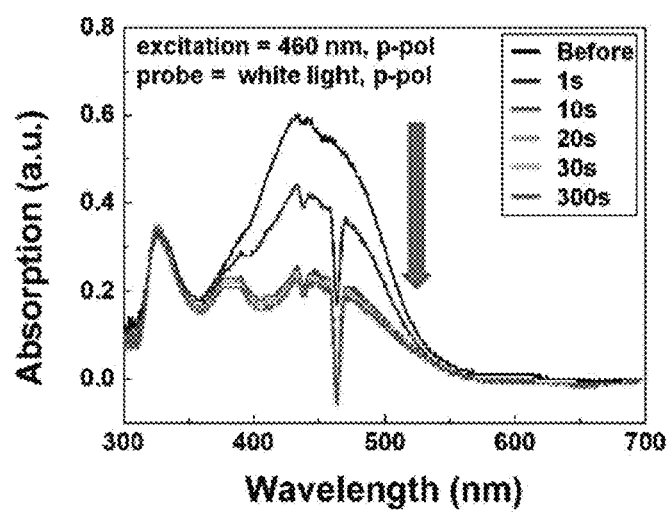
Figure 10:
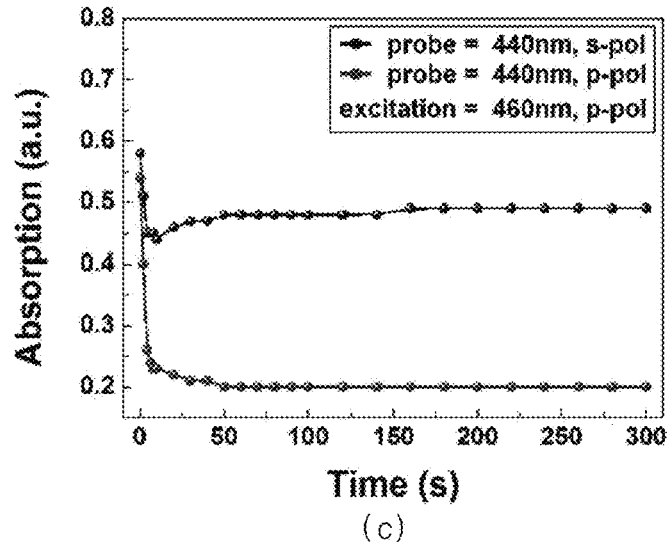
Figure 11:
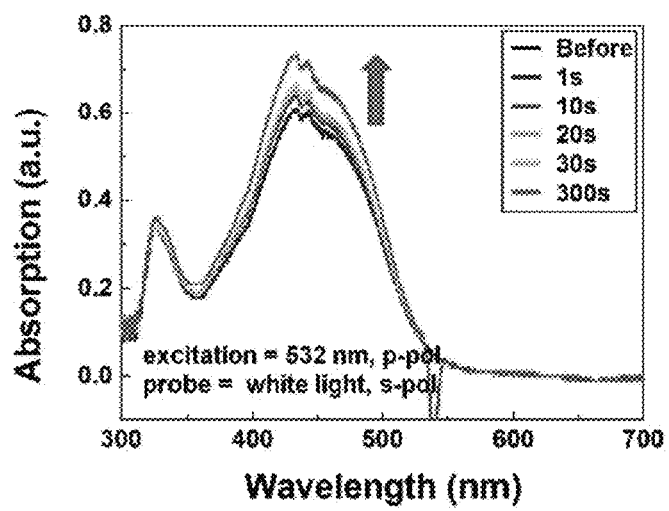
FIG. 11 is graphs illustrating the change characteristics of the light absorption spectrum of the pH-5/95 azobenzene polymer material in a process of writing the holographic information at a writing wavelength at which the trans- and cis-isomers have the same light absorption rate.
Figure 11:
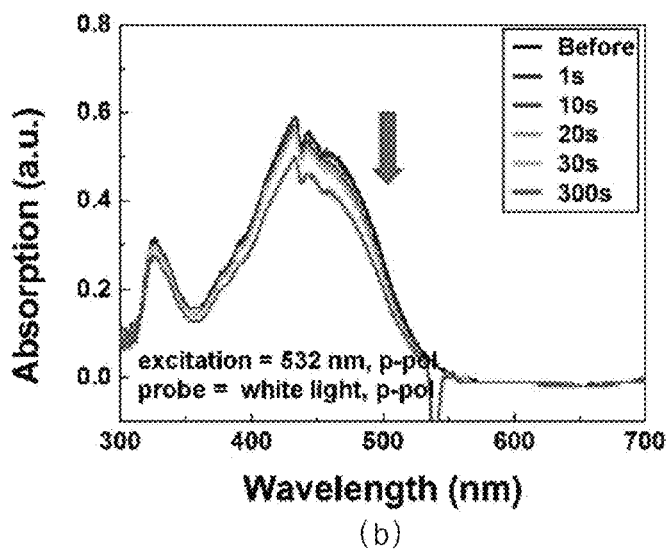
Figure 11:
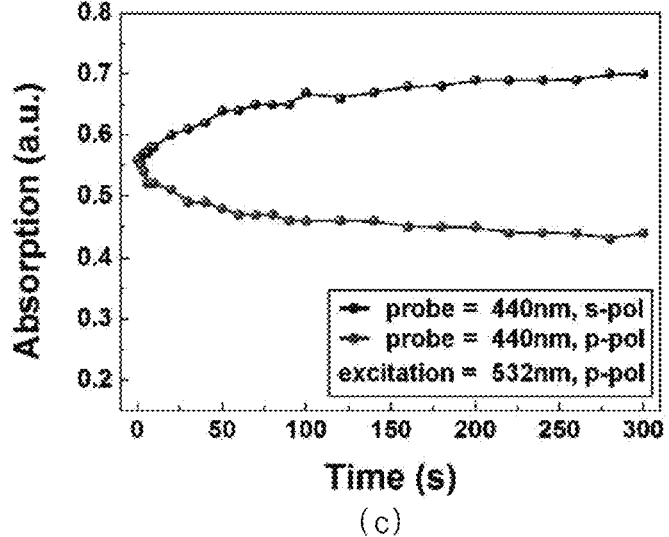

The characteristics of the pH-5/95 azobenzene polymer material according to wavelengths were analyzed to figure out a cause by which a difference between the holographic writing characteristics occurred according to the wavelengths. FIG. 10 is graphs illustrating the change characteristics of the light absorption spectrum of the pH-5/95 azobenzene polymer material in the process of writing the holographic information at the maximum absorption wavelength of about 460 nm. (a) of FIG. 10 illustrates changes in light absorption rate when the holographic information is written by using an s-polarization, (b) of FIG. 10 illustrates changes in light absorption rate when the holographic information is written by using a p-polarization, and (c) of FIG. 10 illustrates changes in light absorption rate at a 440 nm wavelength when the holographic information is written by using the p-polarization. FIG. 11 is graphs illustrating the change characteristics of the light absorption spectrum of the pH-5/95 azobenzene polymer material in the process of writing the holographic information at the writing wavelength $\lambda_{iso}$ of about 534 nm at which the trans- and cis-isomers have the same light absorption rate. (a) of FIG. 11 illustrates changes in light absorption rate when the holographic information is written by using the s-polarization, (b) of FIG. 11 illustrates changes in light absorption rate when the holographic information is written by using the p-polarization, and (c) of FIG. 11 illustrates changes in light absorption rate at the 440 nm wavelength when the holographic information is written by using the p polarization.

Photo-induced dichroism (PID) characteristics refer to a phenomenon in which molecules are aligned by a beam, and when the holographic information is written by using the maximum absorption wavelength $\lambda_{n-\pi*}$ of about 460 nm, a characteristic of very slow alignment is exhibited as illustrated in FIG. 10. In contrast, as illustrated in FIG. 11, it can be seen that, when the holographic information is written by using the writing wavelength $\lambda_{iso}$ of about 534 nm at which the trans- and cis-isomers have the same light absorption rate, the molecules are quickly aligned from an early stage. The characteristic is because the writing wavelength $\lambda_{iso}$ of about 534 nm causes the cis-to-trans reverse isomerization to reversibly occur in the azobenzene polymer in which the cis-isomer has the stable energy state such that the dynamics characteristics of the holographic writing are improved.

Figure 12:
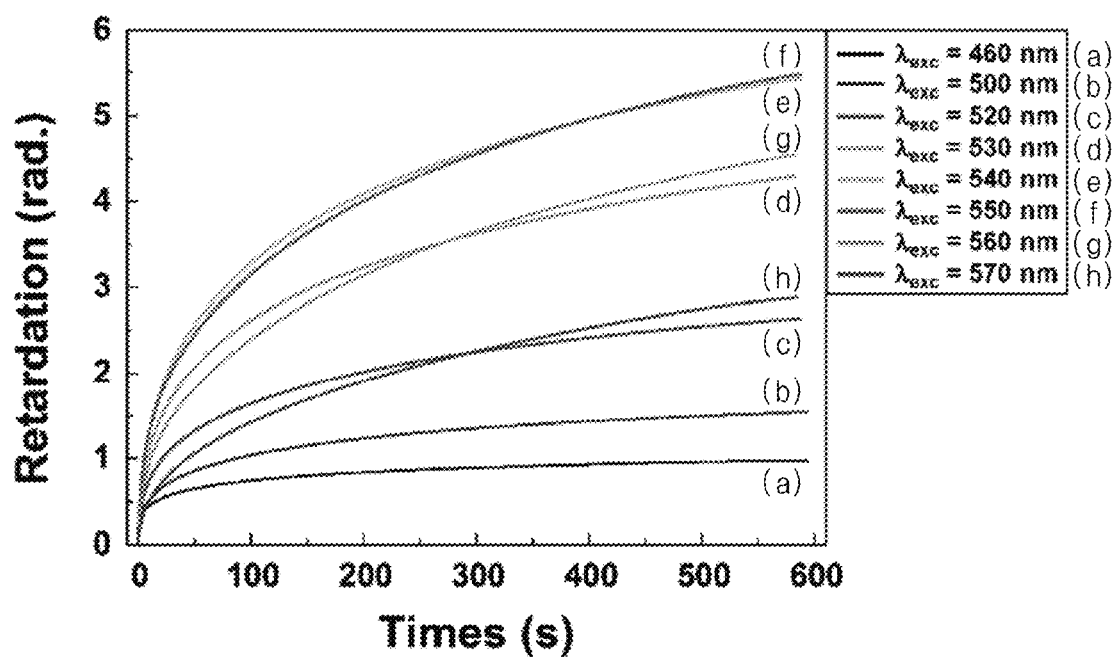
FIG. 12 is a graph illustrating optical anisotropy change characteristics over time while the wavelength of pH-5/95 an excitation beam for writing the holographic information to the azobenzene polymer material varies.
Figure 13:
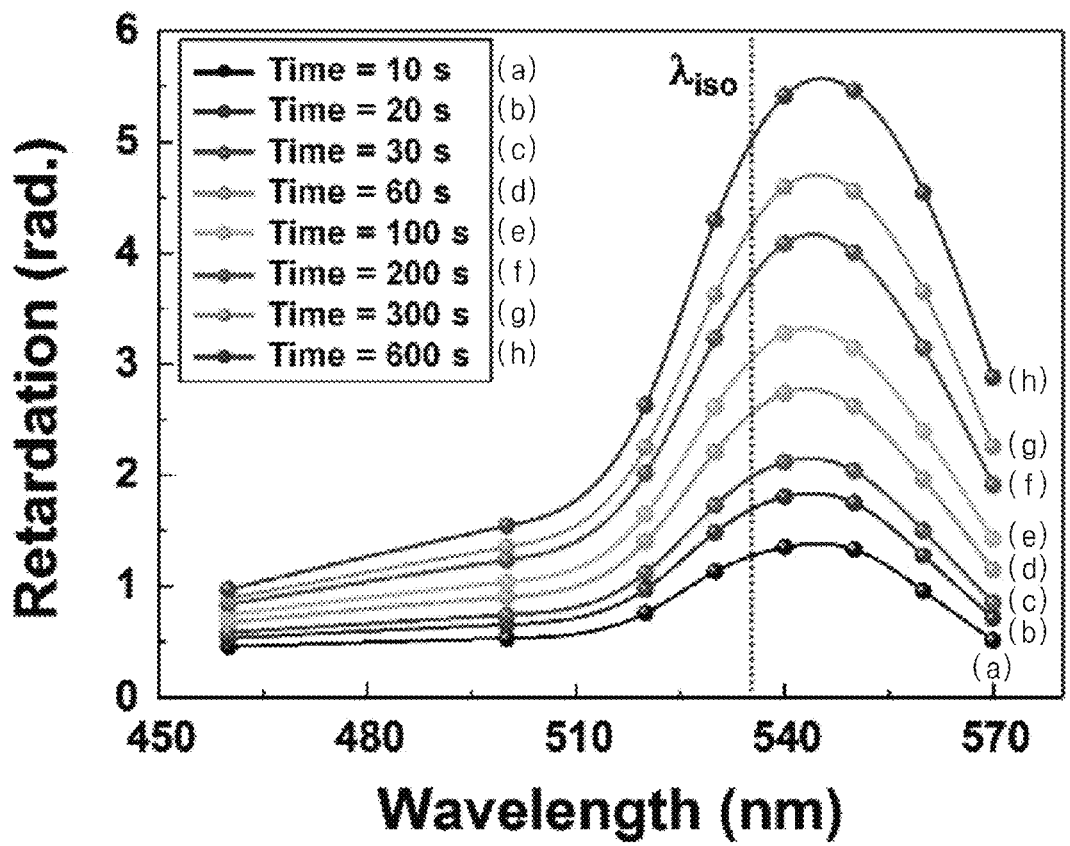
FIG. 13 is a graph illustrating the results of comparison of the wavelength-specific optical anisotropy characteristics of the excitation beam for writing the holographic information to the pH-5/95 azobenzene polymer material.

FIG. 12 is a graph illustrating optical anisotropy change characteristics over time while the wavelength of the excitation beam for writing the holographic information to the pH-5/95 azobenzene polymer material varies. FIG. 13 is a graph illustrating the results of comparison of the wavelength-specific optical anisotropy characteristics of the excitation beam for writing the holographic information to the pH-5/95 azobenzene polymer material. FIG. 13 is the results of PIR characteristics analyzed by using a function according to the wavelengths of the excitation beam. Referring to FIGS. 12 and 13, it can be seen that the optical anisotropy characteristics are sharply improved at a wavelength adjacent to the writing wavelength $\lambda_{iso}$ of about 534 nm at which the trans- and cis-isomers have the same light absorption rate.

For the pH-5/95 azobenzene polymer material, the writing wavelength $\lambda_{iso}$ of about 534 nm at which the trans- and cis-isomers have the same light absorption rate may be a long wavelength that is about 60 nm to about 100 nm greater than the maximum absorption wavelength $\lambda_{n-\pi*}$ of about 460 nm. However, the embodiment of the inventive concept is not limited thereto. In an embodiment, the writing wavelength of the excitation beam for writing the holographic information may be a wavelength of about 534 nm for the pH-5/95 azobenzene polymer material at which the light absorption rates of the photoisomer molecule structures match in the light absorption spectrum.

When the holographic information is written by using a writing wavelength of about 540 nm to 550 nm that is about 5 nm to about 15 nm greater than the writing wavelength $\lambda_{iso}$ of about 534 nm at which the light absorption rates of the photoisomers match, the pH-5/95 azobenzene polymer material exhibits the maximum optical anisotropy characteristics. The maximum optical anisotropy characteristics are because cis-to-trans reverse isomerization response characteristics are improved by the light absorption rate of the cis-isomer further increased when the holographic information is written by using the excitation beam having a writing wavelength slightly greater than the writing wavelength $\lambda_{iso}$ of about 534 nm at which the light absorption rates of the photoisomers match.

Figure 14:
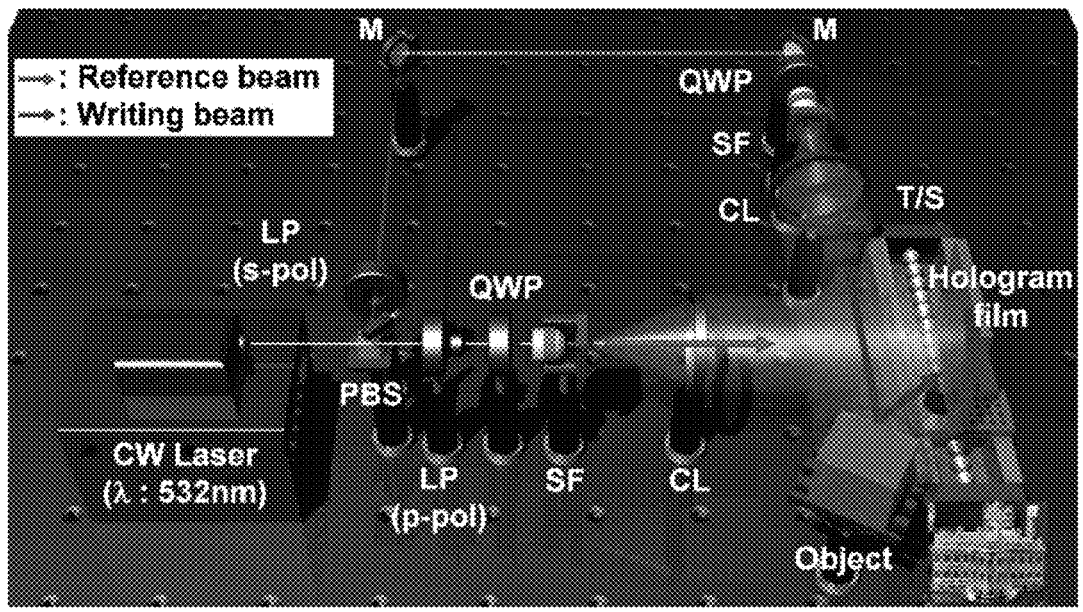
FIG. 14 is a diagram of a holographic writing apparatus in accordance with an embodiment.

FIG. 14 is a diagram of a holographic writing apparatus in accordance with an embodiment. The holographic writing apparatus may include a light emission unit for writing holographic information by emitting a beam at a holographic recording medium. The light emission unit may write the holographic information by emitting an excitation beam having a writing wavelength different from the maximum absorption wavelength in a light absorption spectrum of photoisomer molecule structures of the holographic recording medium. Holographic information on an object was written to the holographic recording medium (hologram film) by allowing the holographic writing apparatus illustrated in FIG. 14 to continuously emit the excitation beam having a writing wavelength $\lambda_{iso}$ at which a trans-isomer and a cis-isomer have the same light absorption rate.

The excitation beam, emitted by a continuous wave laser, is split by a polarization beam splitter PBS into a reference beam in a first polarization direction and a writing beam in a second polarization direction. The reference beam is incident onto a photo-responsable polymer recording medium (hologram film) via a p-polarization linear polarizer LP, a quarter wave plate QWP, a spatial filter SF, and a collimating lens CL.

Figure 15:
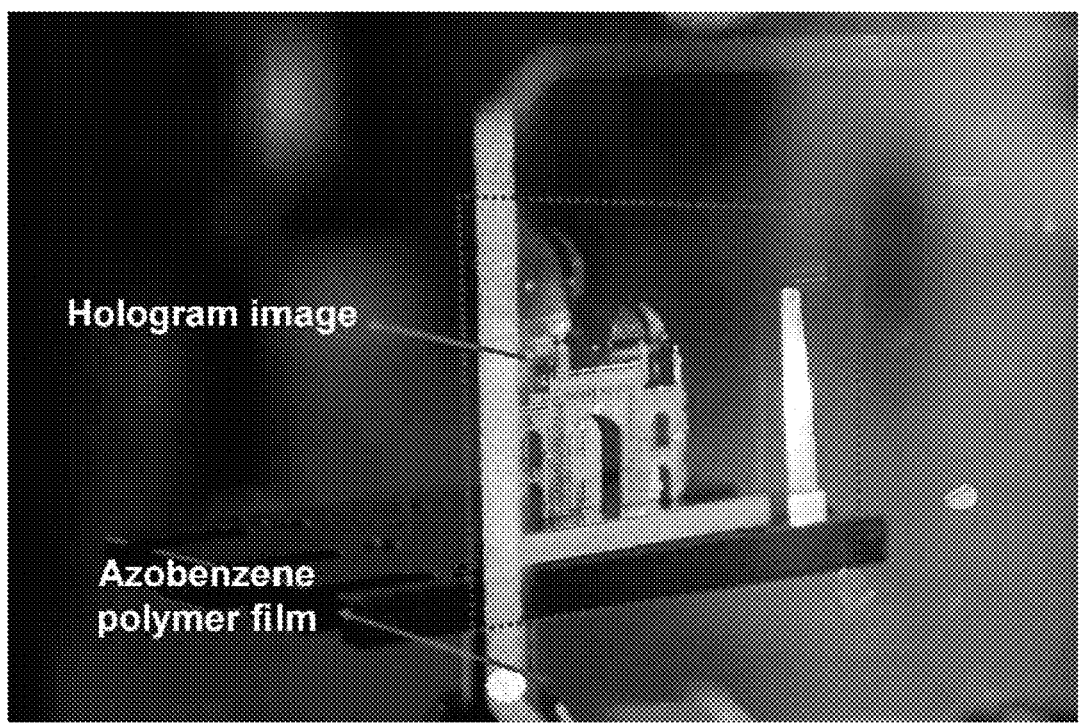
FIG. 15 is an image obtained by capturing, with a camera, a holographic image generated by the holographic writing apparatus in accordance with an embodiment.

The writing beam is incident onto the photo-responsable polymer recording medium (hologram film) after being reflected from the object via a s-polarization LP, reflective mirrors M, the QWP, the SF, and the CL. The holographic information is written to the photo-responsable polymer recording medium by interference between the reference beam and the writing beam incident onto the photo-responsable polymer recording medium (hologram film). FIG. 15 is an image obtained by capturing, with a camera, a holographic image generated by the holographic writing apparatus in accordance with an embodiment.

Figure 16:
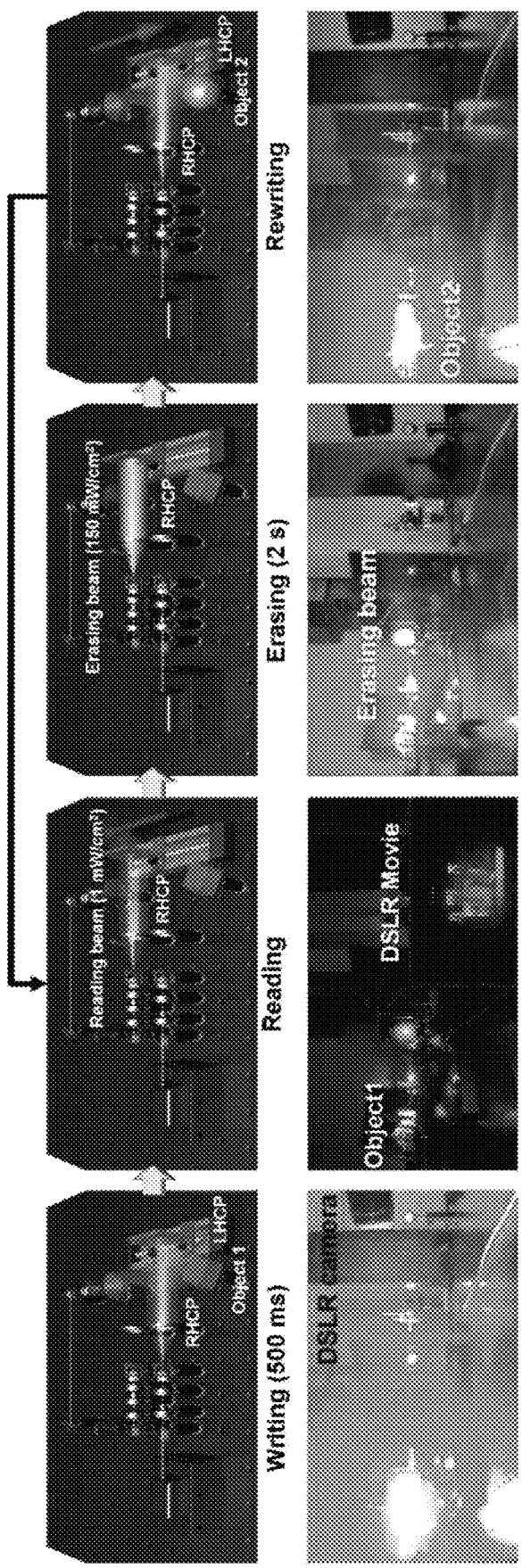
FIG. 16 is views illustrating a holographic re-writing process in accordance with an embodiment.

FIG. 16 is views illustrating a holographic re-writing process in accordance with an embodiment. The possibility of re-writing was verified by repeating a process of writing holographic information on a first object to the holographic recording medium by using the excitation beam, generating a holographic image by emitting a reading beam at the holographic recording medium, deleting the holographic information by emitting an erasing beam at the holographic recording medium, emitting new holographic information on a second object at the holographic recording medium, and generating a re-written holographic image by emitting the reading beam at the holographic recording medium.

Figure 17:
FIGS. 17(a)-(c) are holographic images to which holographic information on a first object is written in accordance with an embodiment.
Figure 17:
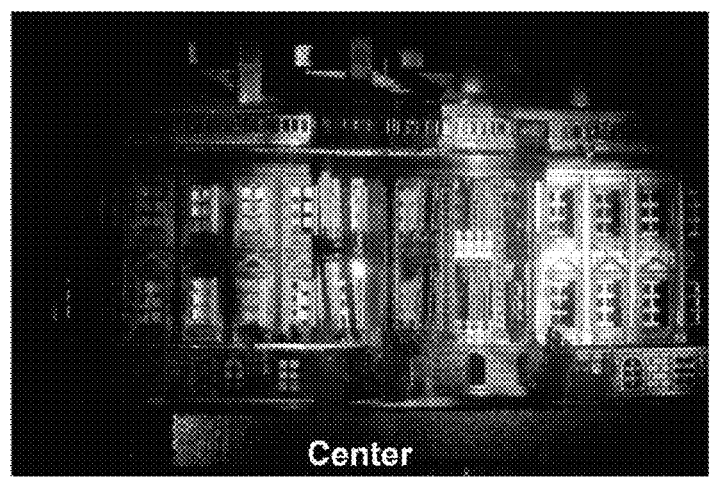
Figure 17:
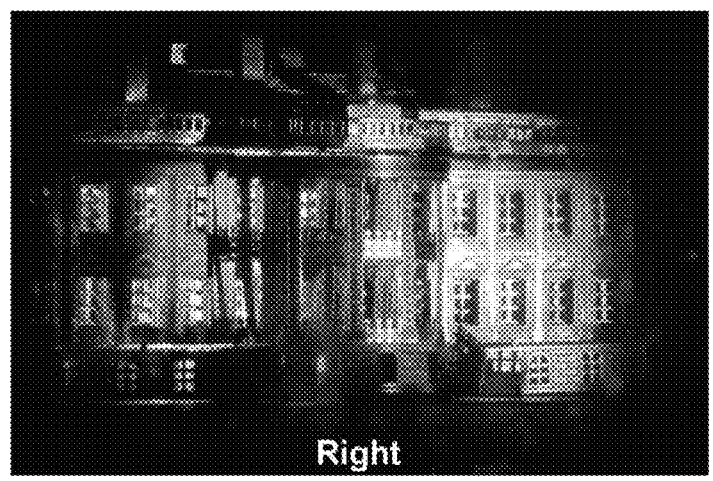
Figure 18A:
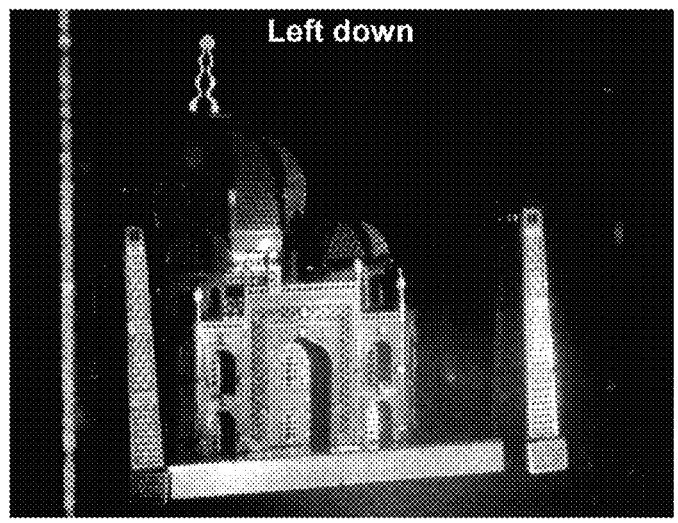
FIGS. 18(a)-(c) are holographic images to which holographic information on a second object is written in accordance with an embodiment.
Figure 18B:
Figure 18C:
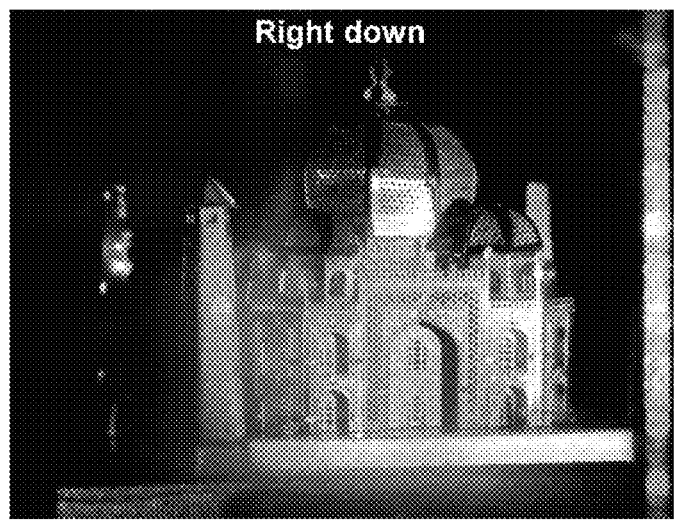
Figure 19A:
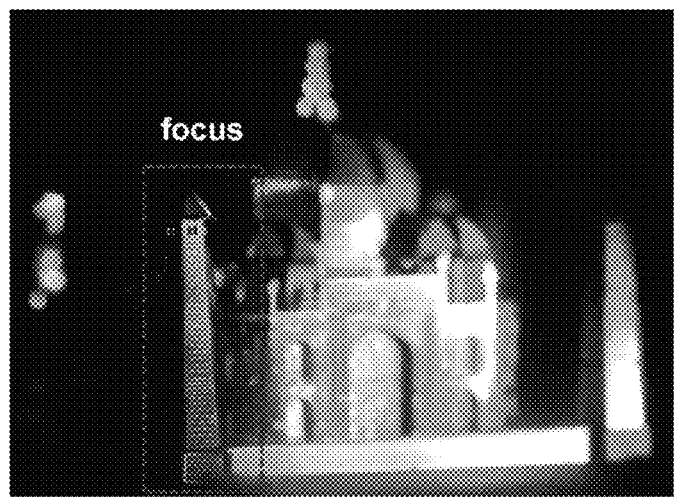
FIGS. 19(a)-(c) are views illustrating the convergence characteristics of holographic images written to various focal positions in accordance with an embodiment.
Figure 19B:
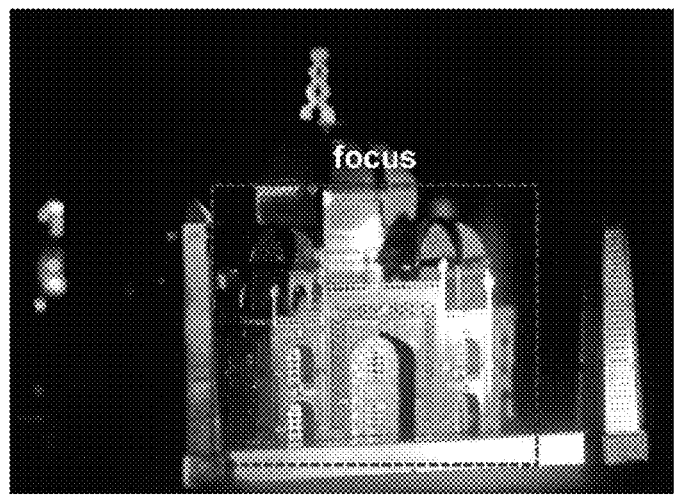
Figure 19C:
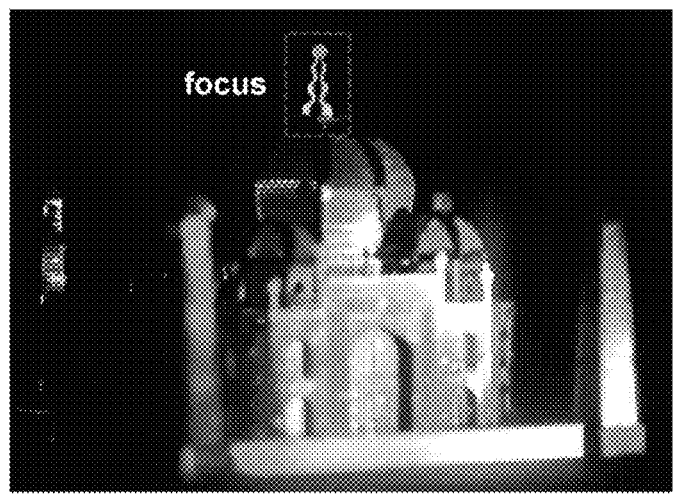

The holographic image of the first object is written to a pH-5/95 azobenzene polymer film, read, and deleted, and then the holographic image of the second object is re-written thereto. FIG. 17 is holographic images to which the holographic information on the first object is written in accordance with an embodiment. FIG. 18 is holographic images to which the holographic information on the second object is written in accordance with an embodiment. FIG. 19 is views illustrating the convergence characteristics of holographic images written to various focal positions in accordance with an embodiment. It can be seen that the holographic images written by the holographic writing apparatus in an embodiment may be re-written, both horizontal and vertical parallax information thereon may be displayed, and the convergence characteristics thereof are also clearly represented.

In accordance with an embodiment of the inventive concept, a high-efficiency and fast-response holographic writing method and apparatus capable of re-writing (updating) the holographic information and quickly writing the holographic information with high efficiency are provided.

The effects of the present invention are not limited to the above-mentioned effects. Unmentioned effects will be clearly understood by those skilled in the art from the present specification and the accompanying drawings.

The above embodiments are presented to help an understanding of the present invention and do not limit the scope of the present invention, from which it should be understood that various modifications are within the scope of the present invention. The technical scope of the present invention should be determined by the technical idea of the claims, and it should be understood that the technical scope of the present invention is not limited to the literal description of the claims, but actually extends to the category of equivalents of technical value.

What is claimed is:

1. A holographic writing method for writing holographic information by emitting a beam at a holographic recording medium containing a photo-responsable polymer material having photoisomerization characteristics that change a molecular structure thereof by absorbing light energy, the holographic writing method writes the holographic information by using a writing wavelength different from a maximum absorption wavelength in a light absorption spectrum of photoisomer molecule structures of the holographic recording medium, wherein the maximum absorption wavelength is a wavelength at which light absorption rate is maximum in the light absorption spectrum, wherein a difference between the light absorption rates of the photoisomer molecule structures at the writing wavelength is less than a difference between the light absorption rates of the photoisomer molecule structures at the maximum absorption wavelength, wherein the photoisomer molecule structures include a trans-isomer molecule structure and a cis-isomer molecule structure, and wherein the writing wavelength is in a range of 5 nm to 15 nm greater than the wavelength at which light absorption rates of the trans-isomer molecule structure and the cis-isomer molecule structure of the photoisomer molecule structures match in the light absorption spectrum.

2. The holographic writing method of claim 1, wherein the photo-responsable polymer material contains an azo polymer material having a covalent bond structure between nitrogens.

3. The holographic writing method of claim 2, wherein the azo polymer material contains an azobenzene polymer material.

4. The holographic writing method of claim 3, wherein the azobenzene polymer material is a material in which a liquid crystalline azobenzene material is dispersed in a polymer matrix.

5. The holographic writing method of claim 1, wherein the photo-responsable polymer material is aligned in a direction perpendicular to a polarization direction of the beam by continuously emitting the beam at the writing wavelength so that the photo-responsable polymer material is repeatedly switched between the trans-isomer molecule structure and the cis-isomer molecule structure.

6. The holographic writing method of claim 1, wherein diffraction efficiency of the photo-responsable polymer material at the writing wavelength is higher than diffraction efficiency of the photo-responsable polymer material at the maximum absorption wavelength.

7. The holographic writing method of claim 1, wherein the writing wavelength is greater than the maximum absorption wavelength.

8. The holographic writing method of claim 7, wherein the writing wavelength is about 60 nm to about 100 nm greater than the maximum absorption wavelength.

9. A holographic writing apparatus for writing holographic information by emitting a beam at a holographic recording medium containing a photo-responsable polymer material having photoisomerization characteristics that change a molecular structure thereof by absorbing light energy, the holographic writing apparatus comprises a light emission unit configured to write the holographic information by emitting the beam at the holographic recording medium, the light emission unit writing the holographic information by emitting the beam at a writing wavelength different from a maximum absorption wavelength in a light absorption spectrum of photoisomer molecule structures of the holographic recording medium, wherein the maximum absorption wavelength is a wavelength at which light absorption rate is maximum in the light absorption spectrum, and a difference between the light absorption rates of the photoisomer molecule structures at the writing wavelength is less than a difference between the light absorption rates of the photoisomer molecule structures at the maximum absorption wavelength, wherein the photoisomer molecule structures include a trans-isomer molecule structure and a cis-isomer molecule structure, and wherein the writing wavelength is in a range of 5 nm to 15 nm greater than the wavelength at which light absorption rates of the trans-isomer molecule structure and the cis-isomer molecule structure of the photoisomer molecule structures match in the light absorption spectrum.

10. The holographic writing apparatus of claim 9, wherein the writing wavelength is greater than the maximum absorption wavelength.

11. The holographic writing apparatus of claim 10, wherein the writing wavelength is about 60 nm to about 100 nm greater than the maximum absorption wavelength.

* * * * *